United States Patent
Tougaw et al.

(10) Patent No.: US 7,602,207 B2
(45) Date of Patent: Oct. 13, 2009

(54) QUANTUM-DOT CELLULAR AUTOMATA METHODS AND DEVICES

(75) Inventors: Paul Douglas Tougaw, Valparaiso, IN (US); Jeffrey D. Will, Valparaiso, IN (US); Christopher R. Graunke, Darien, IL (US); David I. Wheeler, St. Charles, IL (US)

(73) Assignee: The Lutheran University Association, Inc., Valparaiso, IN (US)

( * ) Notice: Subject to any disclaimer, the term of this patent is extended or adjusted under 35 U.S.C. 154(b) by 0 days.

(21) Appl. No.: 11/921,292

(22) PCT Filed: Jun. 7, 2006

(86) PCT No.: PCT/US2006/021782

§ 371 (c)(1),
(2), (4) Date: May 13, 2008

(87) PCT Pub. No.: WO2006/133117

PCT Pub. Date: Dec. 14, 2006

(65) Prior Publication Data

US 2009/0108873 A1 Apr. 30, 2009

Related U.S. Application Data

(60) Provisional application No. 60/687,954, filed on Jun. 7, 2005.

(51) Int. Cl.
*H03K 19/195* (2006.01)
(52) U.S. Cl. ............................................. 326/6; 326/38
(58) Field of Classification Search ................ 326/1–7, 326/37, 38, 93, 101, 102
See application file for complete search history.

(56) References Cited

U.S. PATENT DOCUMENTS

| 6,597,010 | B2 | 7/2003 | Eriksson et al. |
| 6,774,391 | B1 | 8/2004 | Cowburn |
| 7,176,066 | B2 | 2/2007 | Brenner et al. |
| 7,212,026 | B2 * | 5/2007 | Bourianoff et al. ............. 326/7 |

(Continued)

OTHER PUBLICATIONS

Lent et al., "Bistable saturation in coupled quantum dots for quantum cellular automata," Appl. Phys. Lett 62 (7), Feb. 15, 1993, pp. 714-716.

(Continued)

*Primary Examiner*—Don P Le
(74) *Attorney, Agent, or Firm*—Pasky IP Law LLC; Jonathan R. Pasky

(57) ABSTRACT

A Quantum-dot Cellular Automata (QCA) device having normal QCA cells laid out in a planar structure such that there are a set of input lines, that may be columns, and a set of orthogonal, output lines, that may be rows. The device has clocking regions that control the flow of binary signals through the device. The input columns are driven by a separate input signal, and all the cells of each column align to match their input signal. These input columns then serve as drivers for output rows that act as serial shift registers under the control of clock signals applied to sub-sections of the rows. In this way, a copy of the contents of each of the input signals propagates along each of the output rows to an output cell. The output cells of each output row may be assigned their own, latching clock signal.

18 Claims, 11 Drawing Sheets

U.S. PATENT DOCUMENTS 7,277,872 B2 * 10/2007 Raussendorf et al. ......... 706/14

OTHER PUBLICATIONS

Lent et al., "Lines of interacting quantum-dot cells: A binary wire," J. Appl. Phys. 74 (10), Nov. 15, 1993, pp. 6227-6233.

Lent et al., "Bistable saturation in coupled quantum-dot cells," J. Appl. Phys. 74 (5), Sep. 1, 1993, pp. 3558-3566.

Lent et al., "Quantum cellular automata," Nanotechnology 4 (1993), pp. 49-57.

Pasky et al., "Regular arrays of quantum-dot cellular automata 'macrocells'," submitted to J. Appl. Phys., Oct. 1999, pp. 1-27.

Tougaw et al., "Logical devices implemented using quantum cellular automata," J. Appl. Phys. 75 (3), Feb. 1, 1994, pp. 1818-1825.

Gin et al., "Hierarchical Design of Quantum-dot Cellular Automata Devices," submitted to J. of Appl. Phys. Oct. 7, 1998, pp. 1-36.

Lent et al., "A Device Architecture for Computing with Quantum Dots," Proceedings of the IEEE, vol. 85, No. 4, Apr. 1997, pp. 541-557.

Tougaw et al., "Dynamic behavior of quantum cellular automata," J. Appl. Phys. 80 (8), Oct. 15, 1996, pp. 4722-4736.

Lent et al., "Quantum-dot Cellular Automata," a chapter in Nanoelectronic Devices, published by MIT Press (2001).

Henderson et al., "Incorporating Standard CMOS Design Process Methodologies Into the QCA Logic Design Process," IWQDQC Conference at University of Notre Dame Aug. 7-9, 2003, pp. 1-8.

Janulis et al., "Serial Bit Stream Analysis Using Quantum-dot Cellular Automata," IWQDQC Conference at University of Notre Dame Aug. 7-9, 2003, pp. 1-7.

Hee Yong Youn et al., "A Comprehensive Performance Evaluation of Crossbar Networks," IEEE Transactions on Parallel and Distributed Systems, vol. 4, No. 5, May 1993, pp. 481-489.

Birnbaum et al., "Physics and the Information Revolution," Physics Today Jan. 2000, pp. 38-42.

Stan et al., "Molecular Electronics: From Devices and Interconnect to Circuits and Architecture," Proceedings of the IEEE, vol. 91, No. 11, Nov. 2003.

Amlani et al., "Digital Logic Gate Using Quantum-Dot Cellular Automata," www.sciencemag.org Science, vol. 284, Apr. 9, 1999, pp. 289-291.

Lent "Bypassing the Transistor Paradigm," Science, vol. 288 Jun. 2, 2000, pp. 1597-1598.

Smith et al., "QCA Channel Routing With Wire Crossing Minimization," GLSVLSI'05, Apr. 17-19, 2005, pp. 217-220.

Graunke et al., "Implementation of a Crossbar Network Using Quantum-dot Cellular Automata," IEEE Transactions on Nanotechnology, vol. 4, No. 4, Jul. 2005, pp. 435-440.

International Search Report and Written Opinion in PCT/US06/21782 dated Nov. 1, 2007.

* cited by examiner

QUANTUM-DOT CELLULAR AUTOMATA METHODS AND DEVICES

CROSS REFERENCE TO RELATED APPLICATIONS

This application is related to, and claims priority from, U.S. Provisional Patent application No. 60/687,954 filed on Jun. 7, 2005, by Tougaw et al. entitled "Quantum-dot cellular automata crossbar network" the entire contents of which are hereby incorporated by reference.

FIELD OF THE INVENTION

The present invention relates to scalable nanoelectronic methods and devices for switching, and particularly to quantum-dot cellular automata methods and devices.

BACKGROUND OF THE INVENTION

The progress of microelectronics over the last four decades has largely been a result of the semiconductor industry's ability to continuously scale down the transistor, which is the fundamental computing component of modem electronics and computing. This size reduction is, however, unlikely to continue forever. One of the major challenges to continued transistor scaling are leakage currents through the transistor gate. These leakage currents result from quantum mechanical tunneling of electrons from the gate electrode through the gate oxide and into the transistor channel. Such leakage currents are already a significant problem in transistors of the size being fabricated in today's production plants. As transistors continue to shrink, more quantum effects are likely to begin to completely undermine the transistor's effective operation, despite the many different approaches being researched to try and maintain the functionality of transistors at ever smaller scales.

An alternate approach is, instead of continuously fighting to maintain transistor functionality at smaller scales, to devise a device that works on a different principle that lets the device get better rather than worse as feature sizes are reduced. One such novel device is based on a technology called quantum-dot cellular automata (QCA). Originally proposed by Dr. Craig S. Lent at the University of Notre Dame, QCA makes use of the very quantum mechanical effects, such as electron tunneling, that are starting to hinder transistor operation.

QCA is a novel nanoscale computing architecture that attempts to create general computational functionality at the nanoscale by controlling the position of single electrons. The fundamental unit of QCA is the QCA cell, or set of cells each of which is comprised of several quantum dots. FIG. 1 shows a cell 10 created with four quantum dots 12 positioned at the vertices of a square. The bounding box shown around the cell 10 is used only to identify one cell from another and does not represent any physical system. Two of the quantum dots 12 are electron containing dots 14.

These cells 10 can be controlled by clock signals to ignore their environment when relaxing or in a relaxed state, to respond to their environment when they are in the process of locking into a state, and to be independent of their environment, and maintain a given state when they are in a locked state that prevents quantum tunneling. When the cells are responding to their environment, they tend to align in one of two directions, as shown in FIG. 1A and FIG. 1B, and this bistable behavior can be used to encode a binary signal by assigning a "1" to one of the states, such as the state of FIG. 1A and a "0" to the other state, shown in FIG. 1B. A cell also tends to align in the same direction as those cells surrounding it.

By carefully designing the geometric layout of the cells within a device and the clock signals applied to each cell, one can implement any desired combinational or sequential logic function using QCA cells. This fact, along with the very low power consumption and relative ease of device interconnection, makes the QCA system a very attractive nanoscale computing architecture.

A QCA crossbar switch is essentially a massively parallel and customizable QCA wire-crossing network. Several other methods have been suggested in prior art for crossing two independent signals in a QCA system, but each of them has serious weaknesses.

One method involves the use of special cells rotated at a 45-degree angle to the other cells as described in, for instance, the article by P. Douglas Tougaw and Craig S. Lent entitled "Logical devices implemented using quantum cellular-automata," published in the Journal of Applied Physics, vol. 75, pp. 1818-1825 (1994) published by the American Institute of Physics, Melville, N.Y., the contents of which are hereby incorporated by reference. However, this solution significantly decreases the excitation energy between the correct ground state solution and the incorrect excited state solution, thereby degrading both the dynamic response time of the device and the resistance to errors caused by thermal fluctuations.

Other work has focused on the minimization of the necessity for wire crossings. Brian S. Smith and Sung K. Lim, "QCA Channel Routing with Wire Crossing Minimization," Great Lakes Symposium on Very Large Scale Integration, Apr. 17-19, 2005, Chicago, Ill., USA. Unfortunately, it is not possible to eliminate all wire crossings for an arbitrary problem, and the effort to minimize them significantly complicates the design of the remainder of the device.

It has also been demonstrated by Craig S. Lent that QCA wire crossings can be treated as a combinational logic problem, such that two signals can be effectively crossed by the effects of two or more stages of digital logic. While this is a fully functional method for crossing two signals, it is not a scalable solution and would require an intractable number of digital logic gates to provide a fixed set of wire crossings for even a small number of input and output signals.

SUMMARY OF THE INVENTION

A QCA crossbar switch according to the invention includes a number of QCA cells laid out in a planar structure such that there are a set of input columns and a set of output rows. The device is carefully divided into a number of clocking regions such that the flow of binary signals through the device is controlled by the timing of several clock signals applied to the device.

In another feature of the invention, each of a number of input columns is driven by a separate input signal, and all the cells of the column align so as to match that input signal. These input columns then serve as drivers for output rows connected to the input columns once the input column clock signals are driven to locking and locked states.

In yet another feature of the invention, the output rows each act as serial shift registers under the control of the clock signals applied to sub-sections of the rows. In this way, a copy of the contents of each of the input signals propagates from left to right along each of the output rows, arriving eventually at the output end of the row.

In still other features of the invention, the last few cells of each output row are assigned their own clock signal, such that they begin in a relaxed state and only enter the locked state when the desired input signal reaches the end of that row. These few cells then remain in the locked state until all m of the output rows have been locked, and all m output signals can then flow in parallel from the output of the device.

Further areas of applicability of the present invention will become apparent from the detailed description and drawings. It should be understood that the detailed description, drawings and specific examples, while indicating a preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figures 1A, 1B:
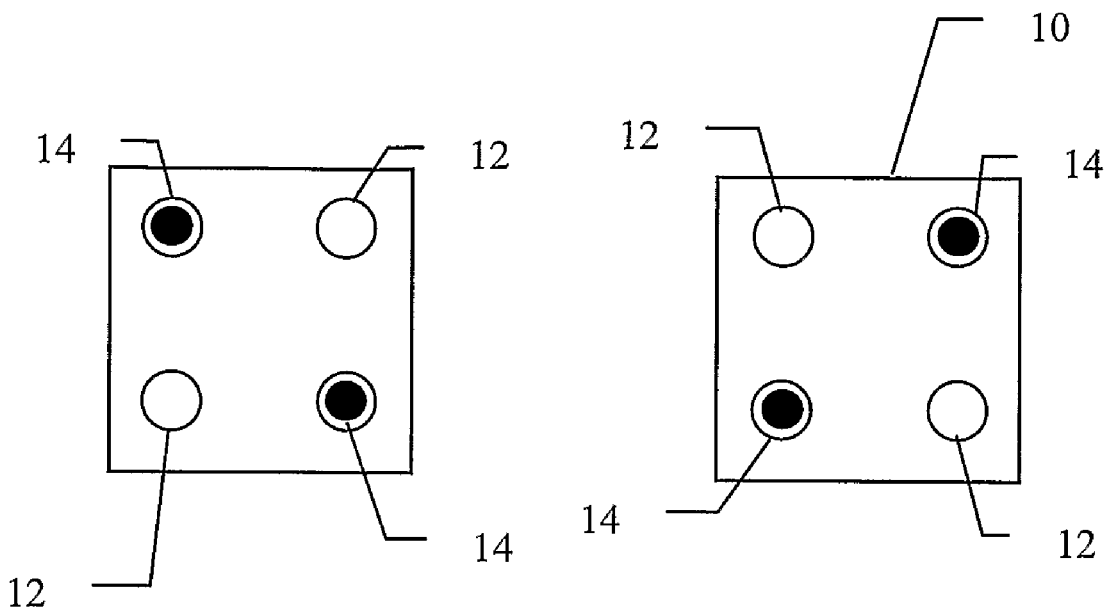
FIG. 1A is a schematic drawing showing a QCA cells representing a first logical state.
FIG. 1B is a schematic drawing showing a QCA cells representing a second logical state.

The present invention applies to Quantum-dot Cellular Automata (QCA) methods and devices. The following description of the preferred embodiment(s) of the methods and devices is merely exemplary in nature and is in no way intended to limit the invention, its application, or uses.

A QCA device according to the present invention is preferably implemented using nanofabricated quantum dots connected by tunnel junctions. Such an implementation of generic QCA devices was first described in 1994 by Craig S. Lent and Douglas Tougaw, "Bistable saturation due to single-electron charging in rings of tunnel-junctions," Journal of Applied Physics, vol. 75, pp. 4077-4080 (1994), published by the American Institute of Physics, Melville, N.Y., the contents of which are hereby incorporated by reference.

In 1997, it was experimentally demonstrated that such an arrangement of metal tunnel junctions could be used to perform digital operations. I. Amlani, A. Orlov, G. Toth, G. Bernstein, C. Lent, and G. Snider, "Digital logic gate using quantum-dot cellular automata," Science, pages 289-291, 1999, the contents of which are hereby incorporated by reference.

An alternative method for fabricating QCA cells was described in 1997 by Craig S. Lent and Douglas Tougaw, "Device architecture for computing with quantum dots," Proceedings of the IEEE, vol. 85, pp. 541-557 (1997), the contents of which are hereby incorporated by reference. This prior art describes methods by which a two-dimensional electron gas (2DEG) formed at a semiconductor heterojunction can be shaped by the geometry of and voltage applied to a metal gate placed in close proximity to the 2DEG.

A second alternative method for fabricating QCA cells was first described in 2000 by Craig S. Lent, "Molecular electronics—Bypassing the transistor paradigm," Science, vol. 288, pp. 1597–+(2000), published by American Association for the Advancement of Science, Washington, D.C., the contents of which are hereby incorporated by reference. In this method, particular molecules are first synthesized and then affixed to a planar substrate.

Using one of these three known fabrication methods incorporated herein by reference for each individual QCA cell, the preferred embodiment of the QCA crossbar switch consists of n vertical input rows and m horizontal output rows, with special clock signals applied to the last few cells of each output row to lock and hold the desired signal until all outputs have been locked.

The inputs to the current invention could come from other QCA devices, in which case the cells at the input of the QCA crossbar would be placed geometrically near the output cells of the other device. In that case, the input cells of the QCA crossbar would align in the same direction as the output cells of the other device, and that information would flow through the QCA crossbar as the cells aligned in the same direction. In the event that these input signals are coming from an external source, such inputs could be controlled by charging or discharging a very small capacitor near the input cell, thereby affecting the electrostatic environment of the first cell in a manner very similar to that of a neighboring cell.

A preferred embodiment of the present invention will now be described by reference to the accompanying drawings in which, as far as possible, like numbers represent like elements.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 2:
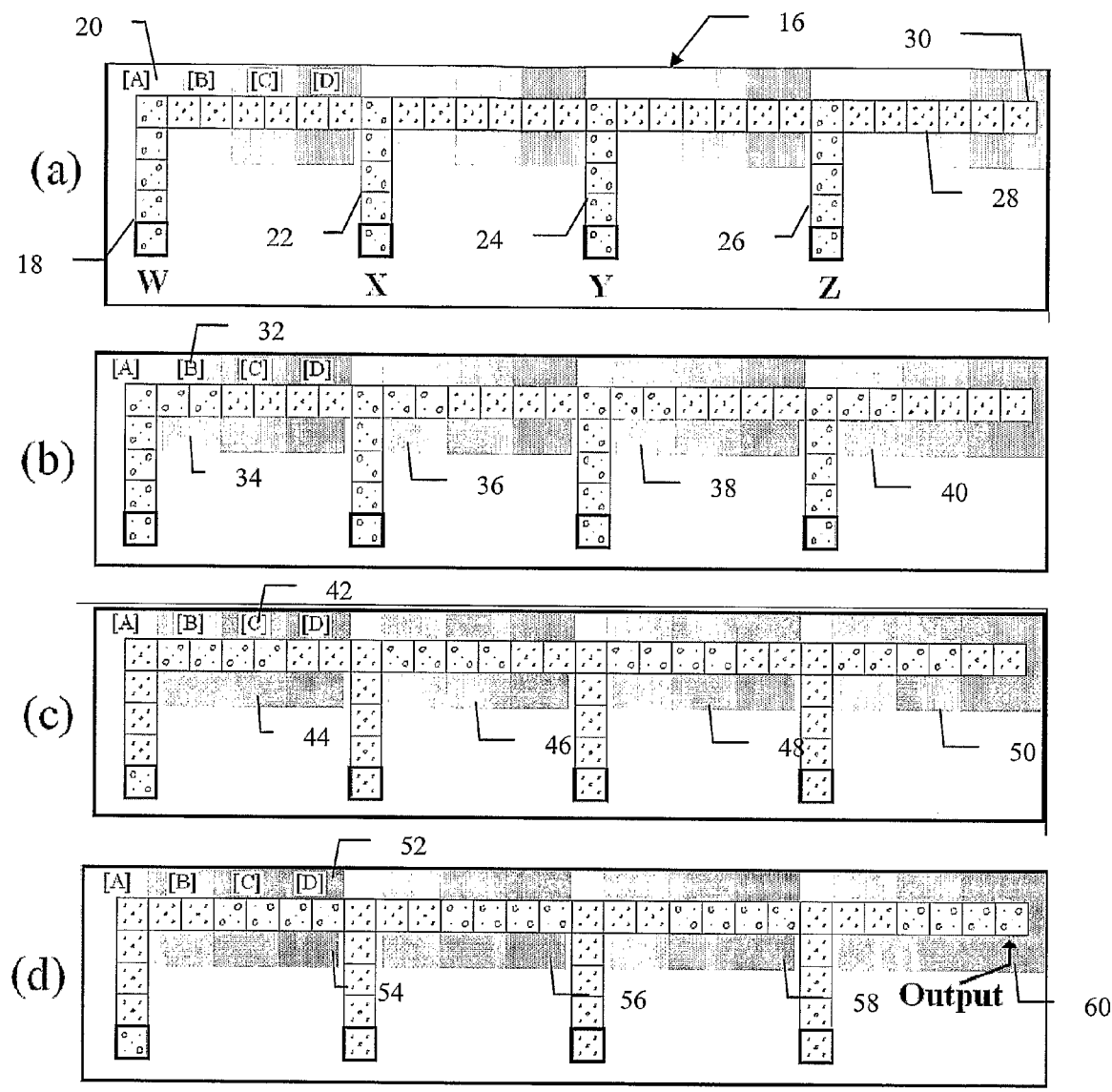
FIG. 2 illustrates a QCA four-input/one-output parallel-to-serial converter according to the present invention.

Referring now to FIG. 2, a four-input/one-output QCA parallel-to-serial converter 16 is illustrated. This device accepts four inputs applied to the input cells labeled W, X, Y, and Z. Each of the input cells W, X, Y and Z is a member of a line normal cells under the control of a common clock, i.e., W is an input cell to the line of normal cells 18 that are under the control of clock 20 (a.k.a. "A"), X is an input cell to the line of normal cells 22 that are also under the control of clock 20 (a.k.a. "A"), Y is an input cell to the line of normal cells 24, that are also under the control of clock 20 (a.k.a. "A"), and Z is an input cell to the line of normal cells 26 that are also under the control of clock 20 (a.k.a. "A"). The parallel-to-serial converter 16 transfers the inputs on the input cells on to an orthogonal line of normal cells 28, and then serially shifts them toward the output cell 30, shown in FIG. 2 on the right, as will be described in detail below. In this way, each of the four input signals will appear at least briefly at the output cell. A normal cell is a square cell in which each of the quantum dots is situated at a corner of the cell, as opposed to a rotated cell in which each of the quantum dots is situated near the mid-point of a side of the square cell.

Figure 3:
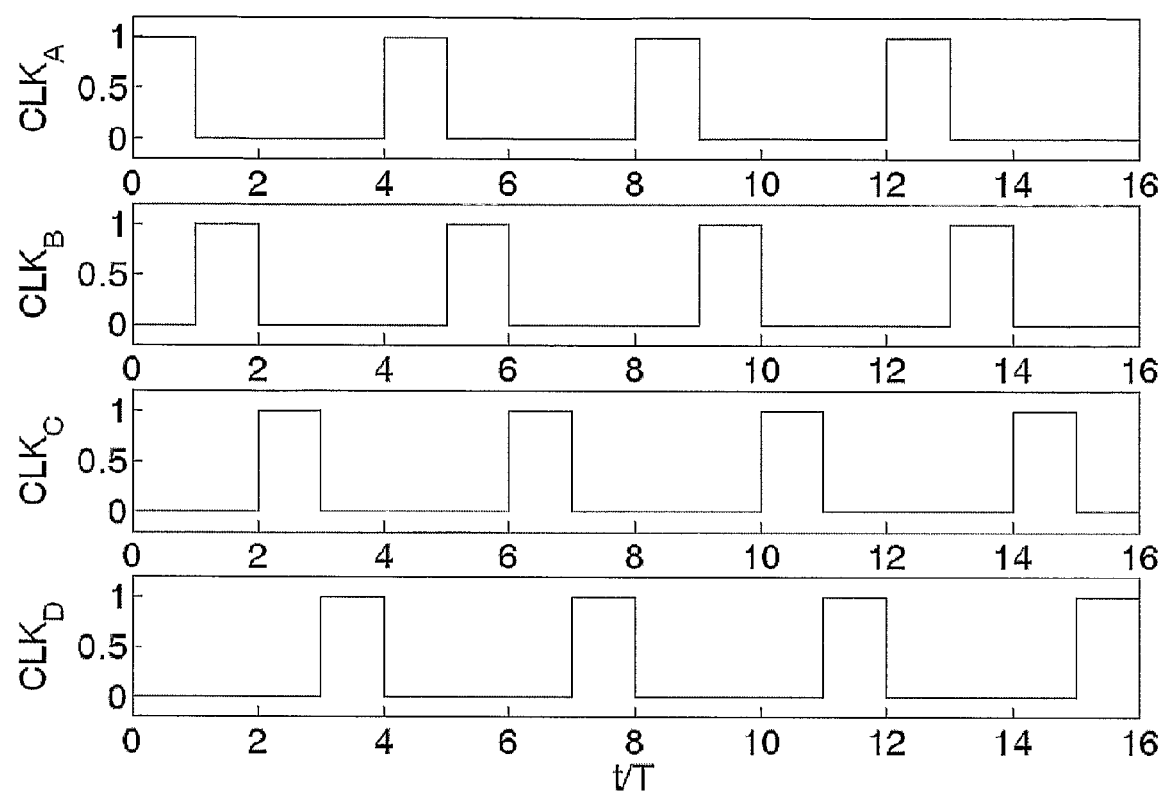
FIG. 3 illustrates the clock signals to be applied to the device illustrated in FIG. 2 in order to enable serial shifting.

Referring now to FIG. 3, the timing of the four clock signals to be applied to the four clocking zones A, B, C and D of FIG. 2 can be seen. If these clock signals are applied to the device shown in FIG. 2, the desired serial shifting of data from left to right will occur.

FIG. 2A represents the parallel-to-serial converter 16 at time period 1, in which clock 20 (a.k.a. clock "A") is locking into a state, , such that the individual cells belonging to lines of normal cells 18, 22, 24 and 26 that are under the control of clock 20 are responsive to their neighboring cells. In this way, the inputs that are placed at input cells W, X, Y and Z are propagated along the lines of normal cells 18, 22, 24 and 26 during clock period 1. As seen from FIG. 2A, the line of normal cells 18 and the line of normal cells 26 both have the same cell state that may, for instance, represent a logical or binary "1", propagated along their length. At the same time, line of normal cells 22 and line of normal cells 24 both have another cell state that may, for instance, represent a logical or binary "0" propagated along their length.

FIG. 2B represents parallel-to-serial converter 16 at time period 2, in which clock 32 (a.k.a. clock "B") is locking into a state, or in a locked stated that allows some degree of tunneling, such that the individual cells belonging to neighbor region 34, 36, 38 and 40 that are all under the control of clock 32, are responsive to their neighboring cells. In this way the binary or logical "1" on line of normal cells 18 is now transferred to neighbor region 34 of the orthogonal line of normal cells 28. Similarly, the binary or logical "0" on line of normal cells 22 is now transferred to neighbor region 36, the binary or logical "0" on line of normal cells 24 is now transferred to neighbor region 38 and the binary or logical "1" on line of normal cells 26 is now transferred to neighbor region 40. The neighbor regions 34, 36, 38 and 40 of orthogonal line of normal cells 28 are all shown as being two normal cells. The reason for this is that the quantum tunneling effects may, under certain circumstances, influence next nearest neighbors. Having at least two normal cells per region is intended to minimize such next-nearest neighbor effect. It should be understood, however, that the neighbor regions in this invention may be only one normal cell, or they may be more than two normal cells, and still encompass the inventive concepts of the invention.

FIG. 2C represents parallel-to-serial converter 16 at time period 3, in which clock 42 (a.k.a. clock "C") is locking into a state, or in a locked stated that allows some degree of tunneling, such that the individual cells belonging to transfer region 44, 46, 48 and 50 that are all under the control of clock 42, are responsive to their neighboring cells. In this way the logical or binary "1" on neighbor region 34 is now transferred to transfer region 44. Similarly the logical or binary "0" on neighbor region 36 is now transferred to transfer region 46, the logical or binary "0" on neighbor region 38 is now transferred to transfer region 48 and the logical or binary "1" on neighbor region 40 is now transferred to transfer region 50.

FIG. 2D represents parallel-to-serial converter 16 at time period 4, in which clock 52 (a.k.a. clock "D") is locking into a state, or in a locked stated that allows some degree of tunneling, such that the individual cells belonging to transfer region 54, 56, 58 and 60 that are all under the control of clock 52, are responsive to their neighboring cells. In this way the logical or binary "1" on transfer region 44 is now transferred to transfer region 54. Similarly the logical or binary "0" on transfer region 46 is now transferred to transfer region 56, the logical or binary "0" on transfer region 48 is now transferred to transfer region 58 and the logical or binary "1" on transfer region 50 is now transferred to transfer region 60.

Transfer region 60 may also represent the output of the system, so that in clock cycle 4, the input placed at input cell Z is now expressed as the output.

As one of ordinary skill in the art will appreciate, as the four clocks 20, 32, 42 and 52 (a.k.a. clocks A, B, C and D) are sequentially cycled, as shown schematically in FIG. 3, the input value initially applied at input cell Y will appear at the output region 60 in clock cycle 8, the input value initially applied at input cell X will appear at the output region 60 in clock cycle 12 and input value initially applied at input cell W will appear at the output region 60 in clock cycle 16.

In this way, using four control clocks to control various regions of orthogonal line of normal cells 28, the inputs from four lines of normal cells can each be expressed in turn at a single output cell. In this way, the device of FIG. 2 represents a parallel-to-serial connector. Although the parallel-to-serial connector of FIG. 2 has four inputs and one output, one of ordinary skill in the art will appreciate that the number of inputs could be as few as one, or as many as may be practically implemented, and may be in the tens, the hundreds or the thousands of inputs, and similarly, the number of outputs could be as many as are practical, and may be in the tens, the hundreds or the thousands of outputs. Similarly, although the parallel-to-serial connector of FIG. 2 is made functional using four clocks and four clocking regions, one of ordinary skill in the art will appreciate that such a device may be made functional using as few as three clocks and three clocking regions.

Figure 4:
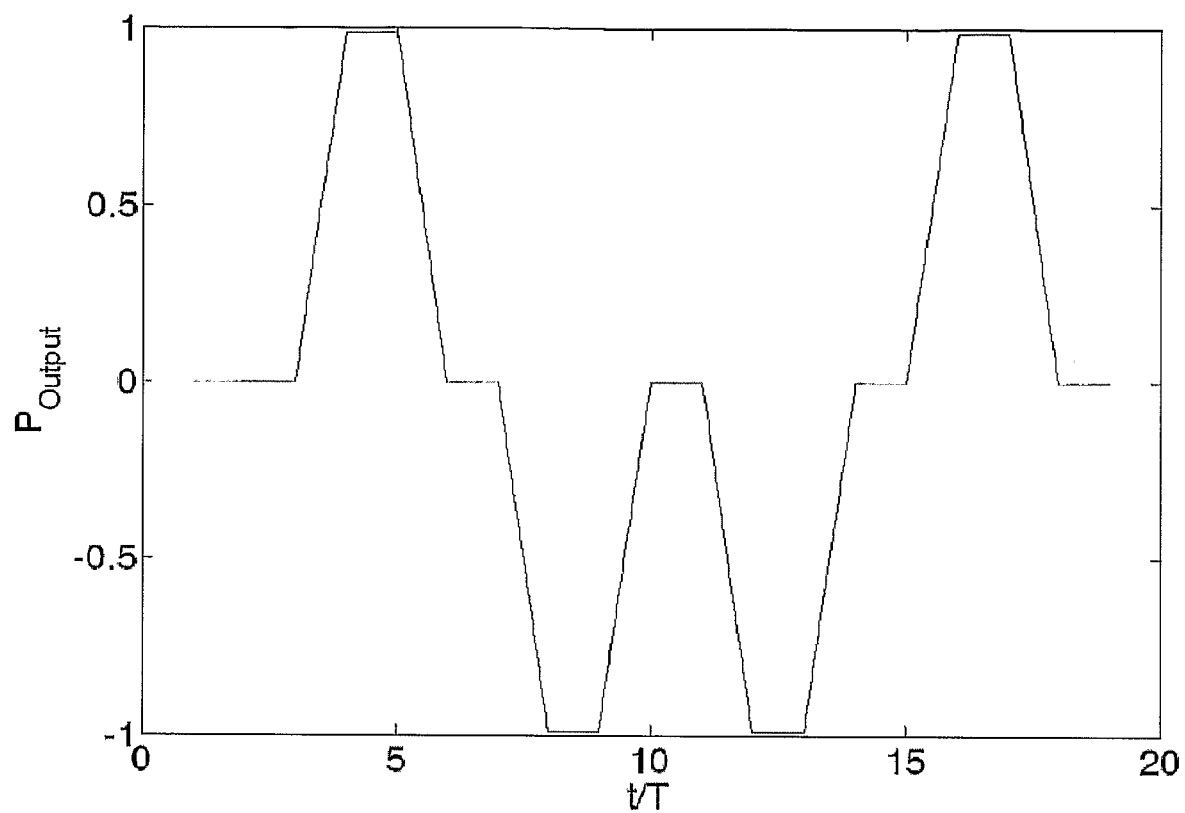
FIG. 4 illustrates the simulated result that appears at the output of the device shown in FIG. 2 when the timing signals of FIG. 3 are applied to it.

Referring now to FIG. 4, we can see the state of the output cell in transfer region 60 of the device shown in FIG. 2 being controlled by the signals shown in FIG. 3. The output cell alternates between being unpolarized (P=0) and being polarized in one of two directions (P=+1 or P=−1) controlled by one of the four input cells. The rightmost input cell, which had the shortest distance to travel, appears first, and then the input labeled Y, then X, then the leftmost input, which is labeled W. In this particular example, this resulted in an output sequence of 1001.

Figure 5:
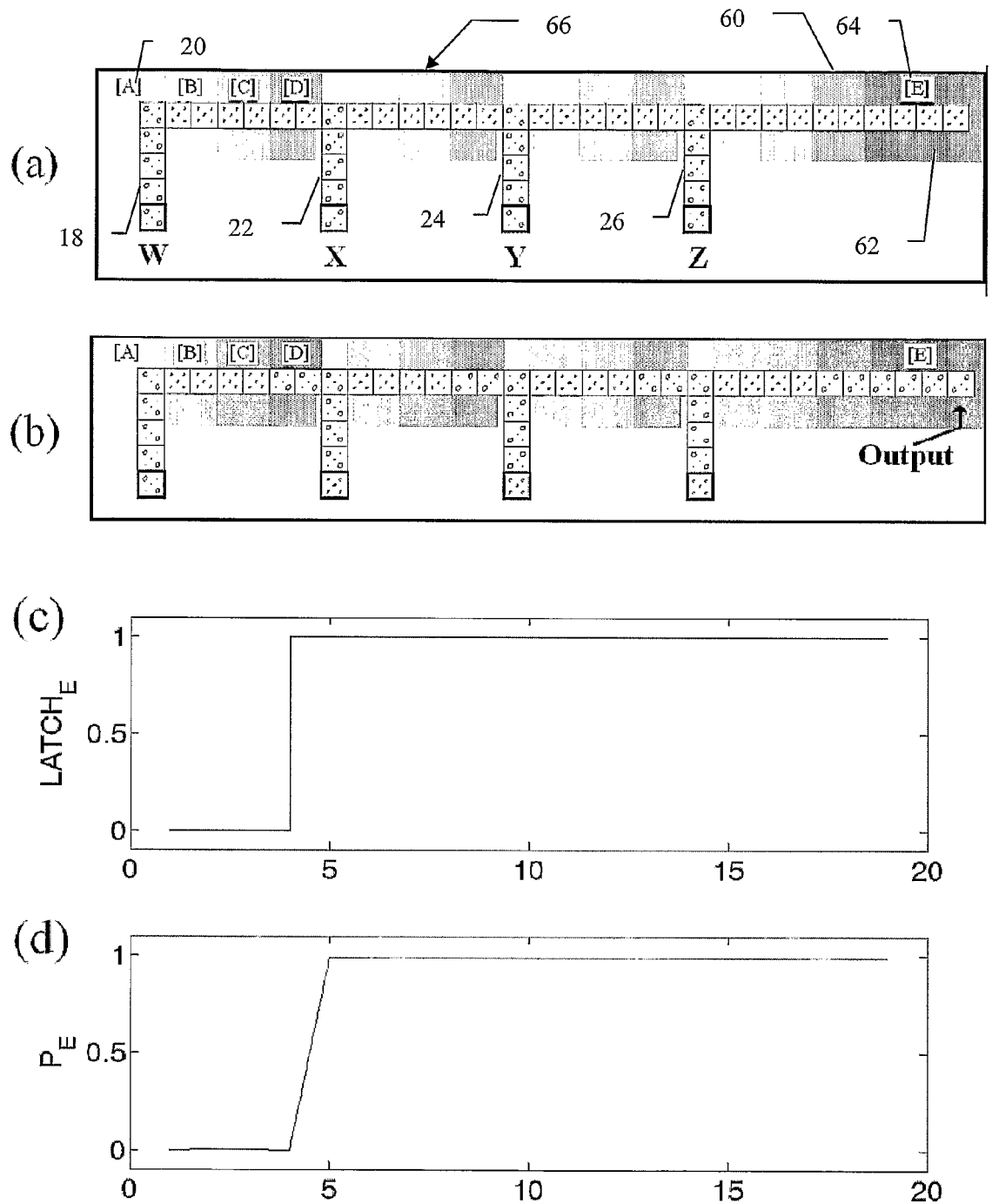
FIG. 5 illustrates a four-input/one-output QCA crossbar switch according to the present invention in which the rightmost input is selected to be delivered to the output.

Referring now to FIG. 5, the device of FIG. 2 has been modified to include a special latching region 62 at the output, under the control of clock 64 (a.k.a. clock "E"). This special latching region 62 will wait until the one desired signal (i.e., one of W, X, Y, or Z) appears at the output of the shift register, and then it will lock that result and hold it for as long as desired. This locking is controlled by the timing of the clock signal assigned to the cells in this region, i.e. clock 64. That signal first instructs the cell to respond to its environment by aligning in the same direction as its neighbors, and then it further instructs the cell to hold its current value regardless of changes to the states of the neighboring cells. The physical nature of this clock signal is a voltage that controls the height of the tunnel barriers separating the quantum dots that comprise each cell. When the barriers are low, electrons are free to tunnel between the sites, and the cell is unpolarized or "relaxed." When the barriers are high, the electrons are unable to tunnel between the sites, the cell is polarized or "locked." In this particular case, the desired signal to be locked and held was Z, the rightmost input.

FIG. 5A shows a four-to-one switch 66 in a first clock cycle with inputs of a logical or binary "0" placed on the input cell W of the line of normal cells 18, a logical or binary "1" placed on the input cell X of the line of normal cells 22, a logical or binary "0" placed on the input cell Y of the line of normal cells 24 and a logical or binary "1" placed on the input cell Z of the line of normal cells 26. The lines of normal cells 18, 22, 24 and 26 are all under the control of the same clock 20.

FIG. 5B shows the four-to-one switch 66 on the fourth clock cycle. The input from input cell Z of the line of normal cells 26 has been transferred to transfer region 60 that is under the control of clock 52. As shown in FIG. 5C, clock 64 (a.k.a. clock "E") that controls latching region 62 is latched on clock cycle 4 so that the logical or binary "1" input at input cell Z is locked and held at the latching region 62.

Figure 6:
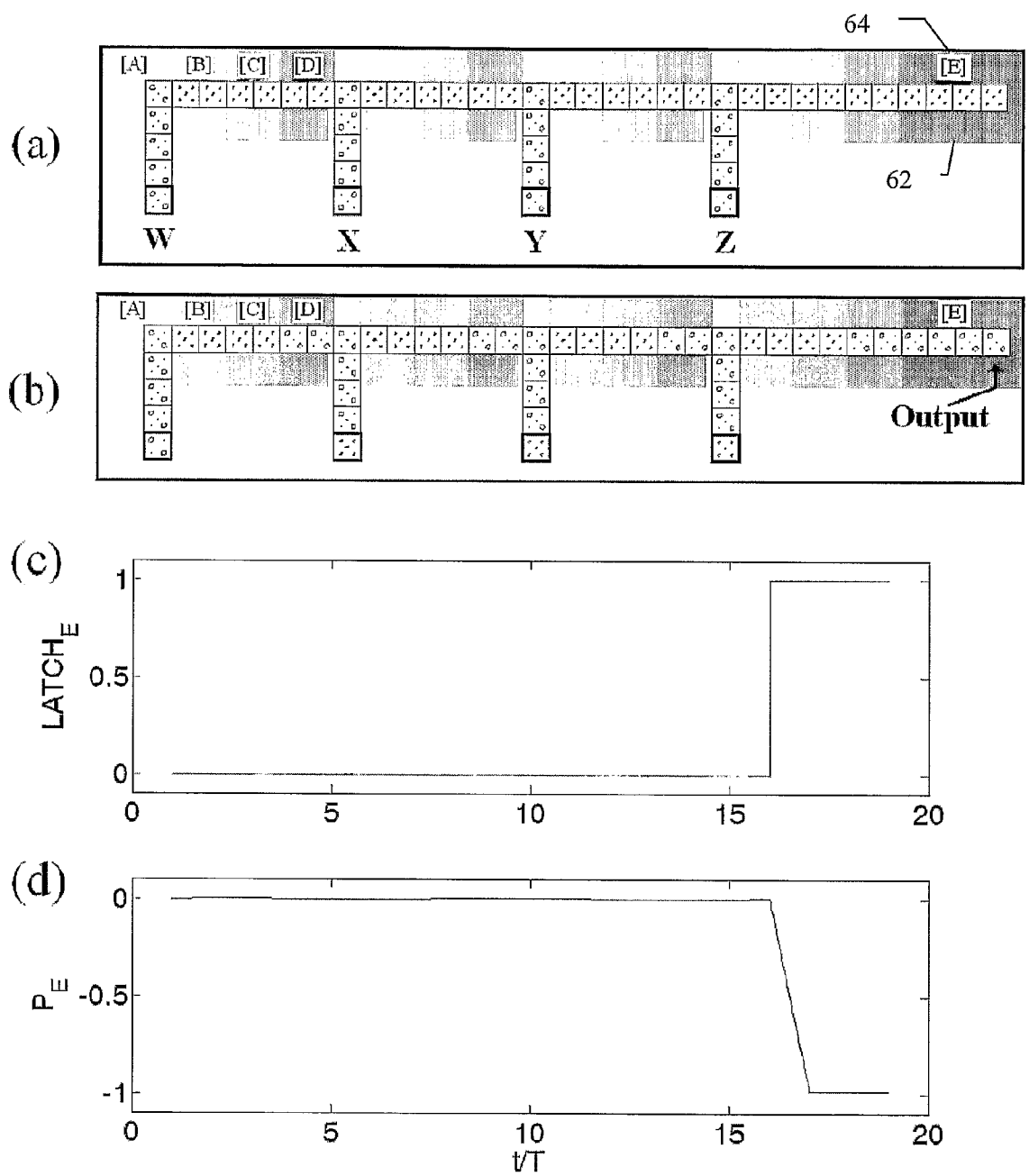
FIG. 6 illustrates a four-input/one-output QCA crossbar switch according to the present invention in which the leftmost input is selected to be delivered to the output.

Referring now to FIG. 6, the device of FIG. 5 is physically unchanged, except that the timing of the clock 64 signal applied to the special latching region 62 is changed. This timing change causes input W (rather than Z) to be locked and held at the output cells by having latching region 62 latch on the 16$^{th}$ clock cycle.

One of ordinary skill in the art will appreciate that by having clock 64 latch on the appropriate cycle, any of the signals applied on any of the four input lines to the four-to-one switch 66 can latched and held at latching region 62. Furthermore, one of ordinary skill in the art will appreciate that, although the invention has been described by reference to a four-to-one switch 66, the inventive concepts illustrated here could also enable any many-to-one switch, where many is any reasonable integer number that may be, but is not limited to, in the range of from one to hundreds to tens of thousands and more.

Figure 7:
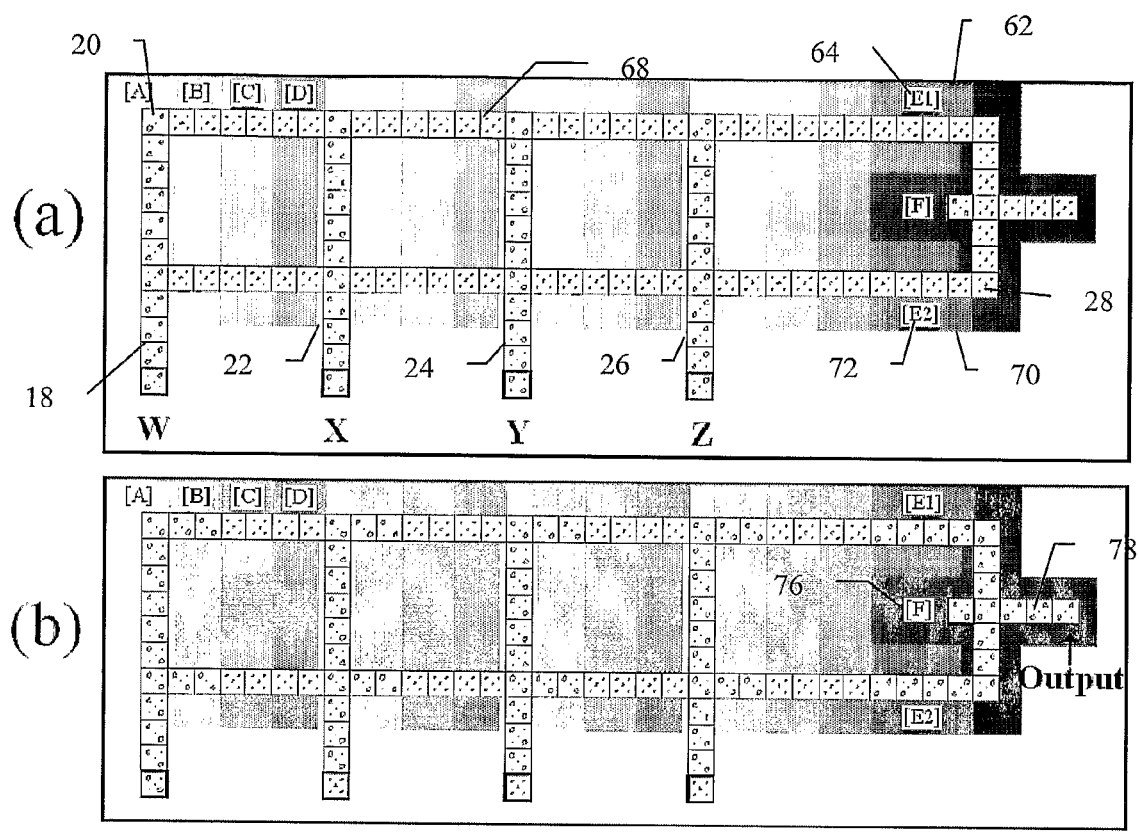
FIG. 7 illustrates a four-input/two-output QCA crossbar switch according to the present invention in which the two outputs are subsequently combined using an AND operator.

Referring now to FIG. 7, the device of FIGS. 5-6 is expanded to include a second output. The exemplary device now has four input cells W, X, Y and Z, each associated with a line of normal cells 18, 22, 24 and 26, all under the control of clock 20 (a.k.a. clock A). There are now two orthogonal lines of normal cells 28 and 68 each having a latching region 62 and 70. Each latching region is under control of its own clock, so that latching region 62 is under the control of clock 64 (a.k.a. clock El) and latching region 70 is under the control of clock 72 (a.k.a. clock E2).

FIG. 7A shows the inputs being applied to the four input cells W, X, Y and Z on clock cycle 1.

FIG. 7B show the device a number of clock cycles later. The four input signals have progressed down both output lines and each of the special latching regions locks and now holds its own desired signal by having been latched at the appropriate time. This is done under the control of two separate clock signals, each of which is assigned to one of the two special latching regions. Clock 64 has been used to latch a logical or binary "1" at latching region 62. This "1" may have been transferred from either input cell W or input cell Z. Similarly, clock 72 has been used to latch a logical or binary "1" at latching region 70. This "1" may have been transferred from either input cell W or input cell Z. One of ordinary skill will appreciate that any one of the four inputs may have been latched at either of the two latching regions 62 and 70.

Furthermore, the two output signals are then logically combined. In this particular example, the combining is done using an AND gate to create a single combined output. This is accomplished by each of the latching regions 62 and 70 now being connected to the input of AND gate 78 controlled by clock 76 (a.k.a. clock "F"). One of ordinary skill in the art will appreciate that the latching regions 62 and 70 could be combined using any arbitrary combinational function such as, but not limited to addition, "exclusive OR"ing or multiplication.

Figure 8:
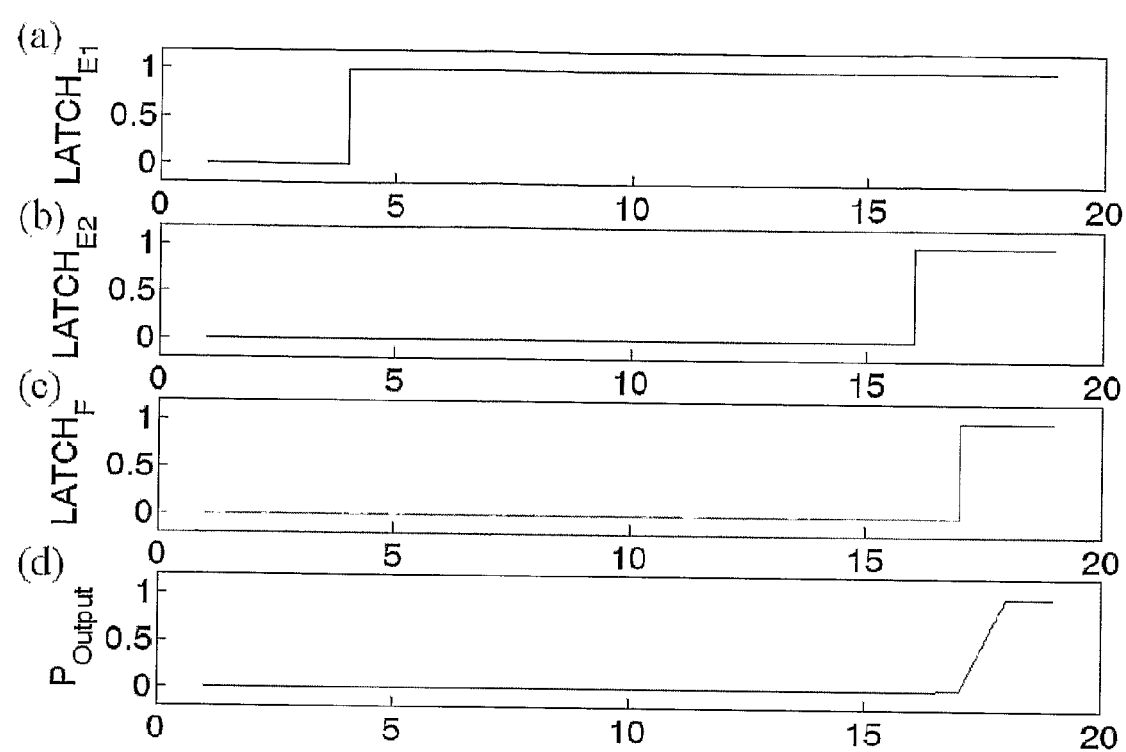
FIG. 8 illustrates the clock signals to be applied to the three special latching regions at the output of the device illustrated in FIG. 7 and the simulated result of the device's output.

Referring now to FIG. 8, the timing diagrams to be applied to FIG. 7 illustrate that latching region 62 controlled by clock 64 (a.k.a. clock "E1") locks and holds input Z by being latched on the fourth clock cycle. Meanwhile latching region 70 controlled by clock 72 (a.k.a. clock "E2") locks and holds input W by being latched on cycle 16. The output of this particular network is, therefore, the logical combination Z AND W. As in this example, Z and W are both the logical "1", the output is also logical "1".

Figure 9:
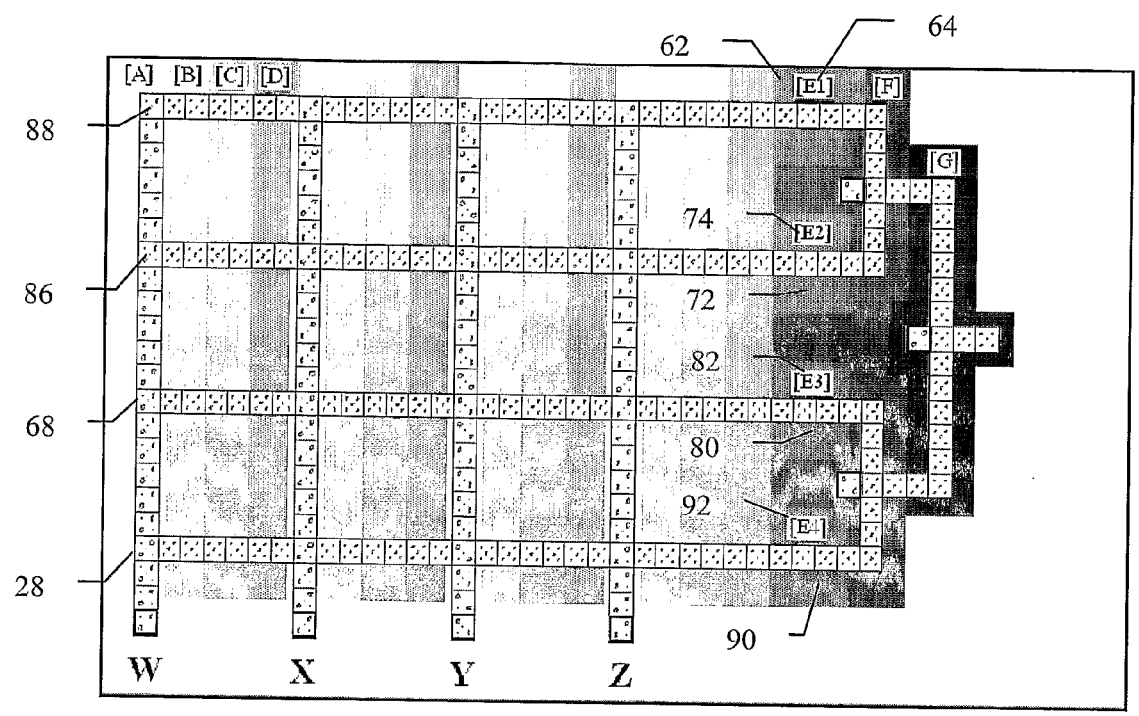
FIG. 9 illustrates a four-input/four-output QCA crossbar switch according to the present invention during the time when the vertical inputs are being locked.

Referring now to FIG. 9, the device illustrated in FIGS. 7-8 is expanded to include four outputs on four orthogonal lines of normal cells 28, 68, 86 and 88. In this figure, the vertical input lines have just been locked, and the horizontal output lines are about to begin shifting the input signals toward the special latching regions at the output of each row.

Figure 10:
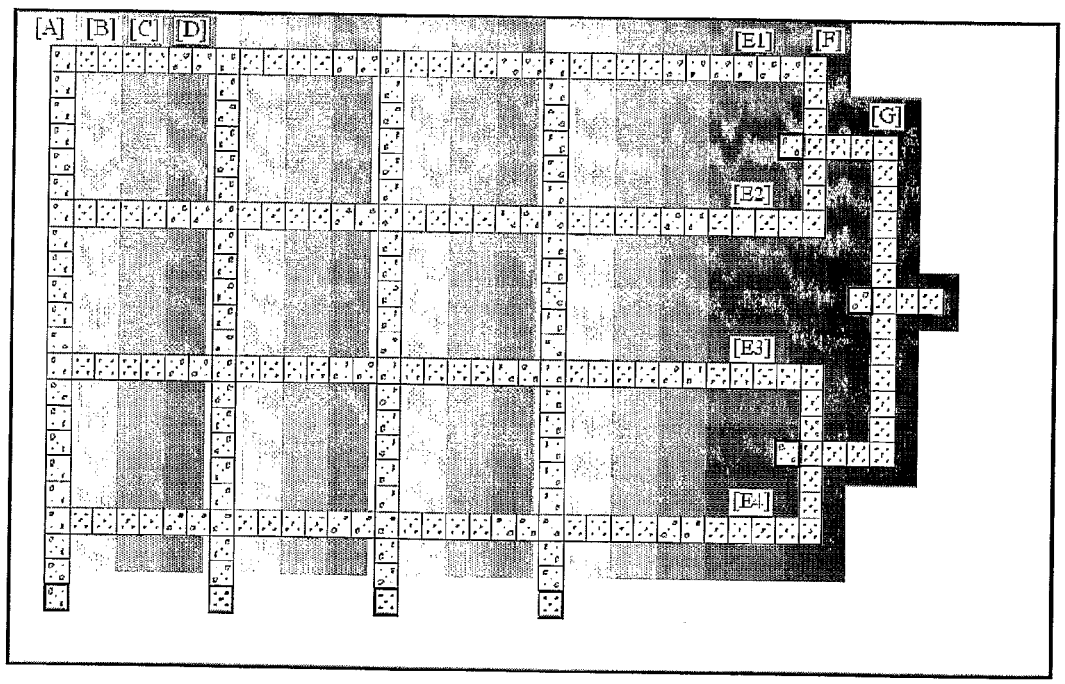
FIG. 10 illustrates a four-input/four-output QCA crossbar switch according to the present invention during the time when the rightmost input has reached a special latching zone at the output and is selected by zone E1.

Referring now to FIG. 10, the signals from FIG. 9 have propagated such that input Z is now available to all four of the special latching regions 62, 72, 80 and 90, controlled by clocks 64, 74, 82 and 92 (a.k.a. clocks "E1", "E2", "E3" and "E4") respectively. In this particular example, only latching region 62, under the control of clock 64 ( a.k.a. clock "E1") locks and holds the signal from input Z, and latching regions 72, 80 and 90, controlled by clocks, 74, 82 and 92 (a.k.a. clocks "E2," "E3," and "E4") ignore that input. This is again controlled by the clock signal, which first requires the cell to align with its environment, and then it raises the barriers between the quantum dots to a point where the electrons can no longer tunnel off of the dots they inhabit, preventing further response to neighboring cells.

Figure 11:
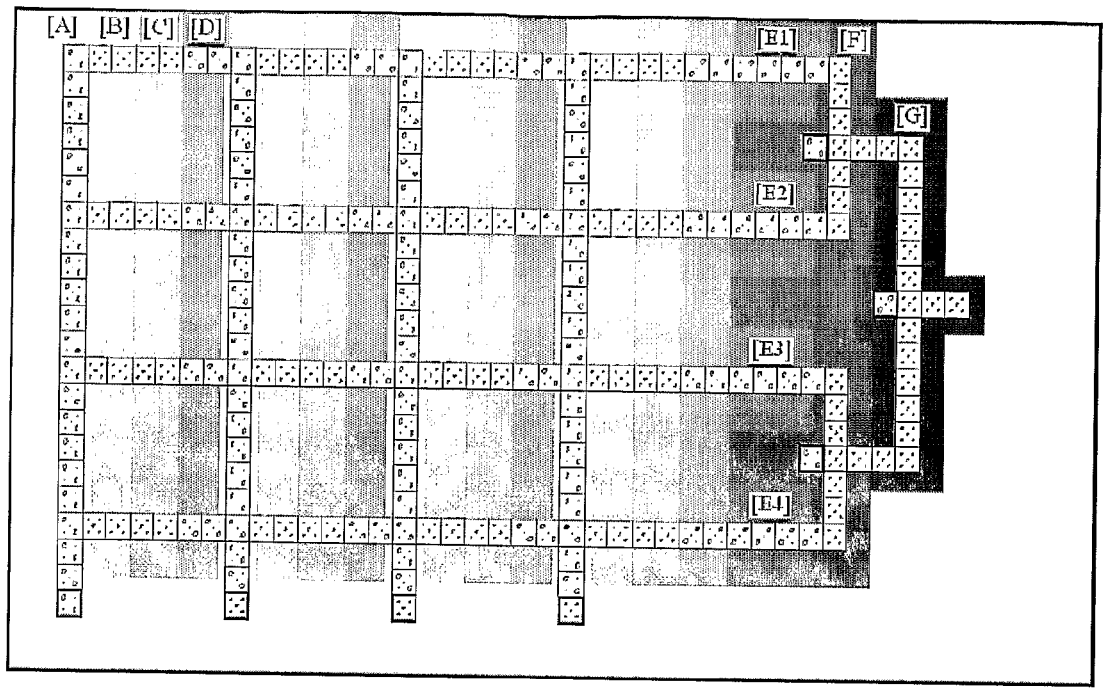
FIG. 11 illustrates a four-input/four-output QCA crossbar switch according to the present invention during the time when the leftmost input has reached a special latching zone at the output and is selected by zone E4.

Referring now to FIG. 11, the signals from FIGS. 9-10 have propagated such that input W is now available to all four of the special latching regions 62, 72, 80 and 90. In this particular example, only special latching region 90, controlled by clock 92 (a.k.a. clock "E4") locks and holds the signal from input W, because latching regions 62, 72, 80 controlled by clocks 64, 74, 82 (a.k.a. clocks "E1," "E2," and "E3") have already locked in earlier signals.

Figure 12:
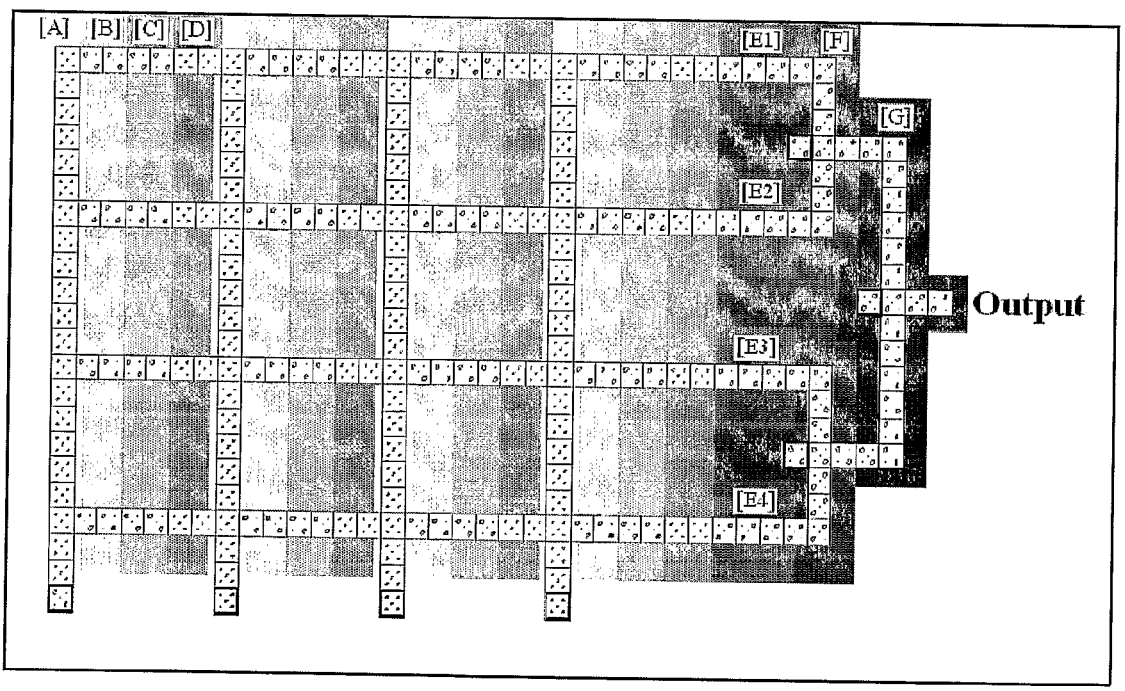
FIG. 12 illustrates a four-input/four-output QCA crossbar switch according to the present invention during the time when the output of the two-level sum-of-products calculation has been completed.

Referring now to FIG. 12, the combinational logic attached to the output of the QCA crossbar switch has performed the desired logical operation. In this particular example, that operation is (Z AND X) OR (Y AND W). Note that any other arbitrary sum-of-products function of the four uncomplemented inputs could have been calculated, e.g., (X AND Y) OR (Z AND W) by the same cell layout, changing only the timing of the clock signals attached to the special latching regions.

Figure 13:
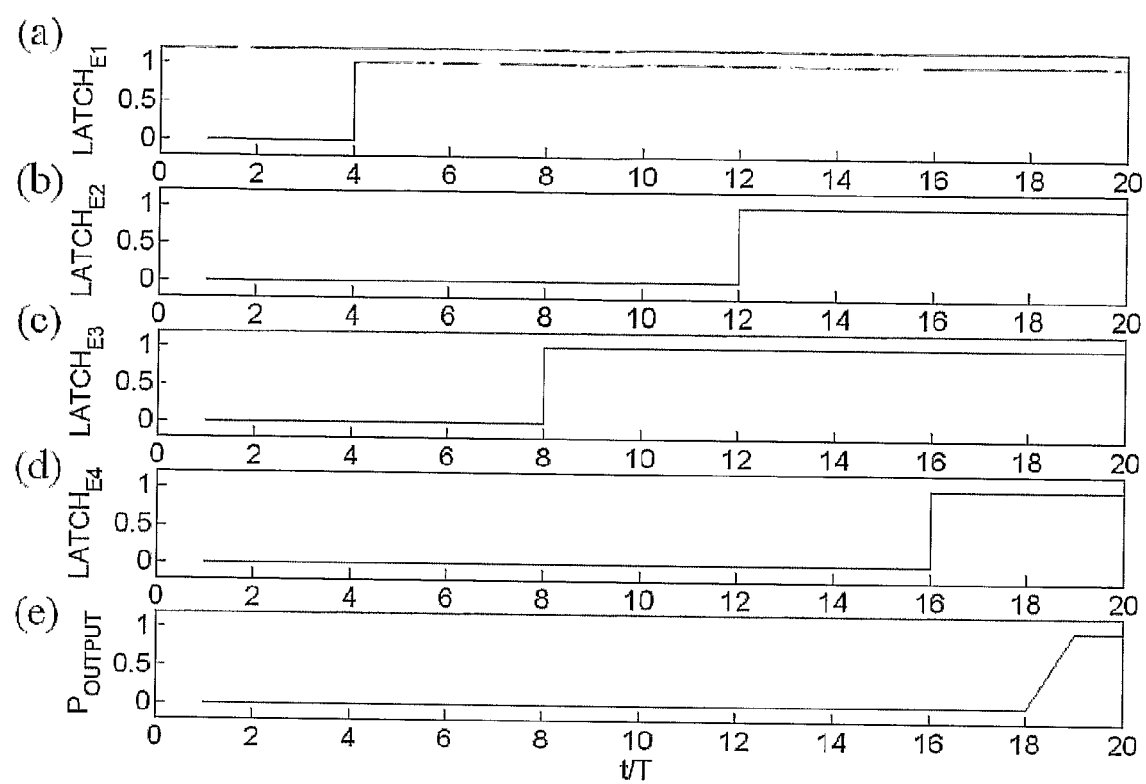
FIG. 13 illustrates the clock signals to be applied to the special latching zones at the outputs of the device illustrated in FIGS. 9-12 in order to swap the middle two inputs.

Referring now to FIG. 13, we see the timing of the clock signals that should be applied to the device from FIGS. 9-12 in order to perform the operation indicated in FIG. 11. These timing signals effectively swap the two middle inputs (X and Y), leaving the order of W and Z unchanged.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A quantum-dot cellular automata device, comprising:
   a first line of normal cells controlled by a first clock;
   a second line of normal cells arranged substantially parallel to said first line of normal cells and controlled by said first clock; and
   a third line of normal cells substantially orthogonal to said first and second lines of normal cells and connected to said first line of normal cells at a first common cell and to said second line of normal cells at a second common cell, said third line of normal cells having a first neighbor region located adjacent to said first common cell and controlled by a second clock and a second neighbor region located adjacent to said second common cell controlled by said second clock.

2. The device of claim 1 wherein said third line of normal cells further comprises a first transfer region located adjacent to said first neighbor region, and a second transfer region located adjacent to said second neighbor region, and wherein said first and second transfer regions are controlled by a third clock.

3. The device of claim 2 wherein said third line of normal cells further comprises a third transfer region located adjacent to said first transfer region, and a fourth transfer region located adjacent to said second transfer region, and wherein said third and fourth transfer regions are controlled by a fourth clock.

4. The device of claim 3 wherein said first and second neighbor region and said first, second, third and fourth transfer regions each comprise two normal cells.

5. The device of claim 1 wherein said third line of normal cells further comprises a first output region controlled by a fifth clock.

6. The device of claim 5 further comprising a fourth line of normal cells arranged substantially orthogonal to said first and second lines of normal cells and connected to said first line of normal cells at a third common cell and to said second line of normal cells at a fourth common cell, said fourth line of normal cells having a third neighbor region located adjacent to said third common cell and controlled by said second clock, and a fourth neighbor region located adjacent to said fourth common cell and controlled by said second clock, and a second output region controlled by said fifth clock.

7. The device of claim 6 wherein said first and second output regions are connected to a combinational logic gate controlled by a sixth clock.

8. The device of claim 7 wherein said combinational logic gate is an AND gate.

9. The device of claim 7 wherein said combinational logic gate is an OR gate.

10. A method of transferring information in a quantum-dot cellular automata device, said method comprising the steps of:
    applying a first input state to a first line of normal cells controlled by a first clock;
    applying a second input state to a second line of normal cells arranged substantially parallel to said first line of normal cells and controlled by said first clock;
    transferring said first input state to a first neighbor region of a third line of normal cells, said third line of normal cells being located substantially orthogonal to both said first and second lines of normal cells and being connected to said first line of normal cells at a first common cell located adjacent to said first neighbor region, said transferring comprising controlling said first neighbor region using a second clock; and
    transferring said second input state to a second neighbor region of said third line of normal cells, said second neighbor region being located adjacent to a second common cell connecting said first and third lines of normal cells; said transferring comprising controlling said second neighbor region using said second clock.

11. The method of claim 10 further comprising the step of:
    moving said first and second input state along said third line of normal cells using a third clock controlling both a first and a second transfer region of said third line of normal cells, said first transfer region being located adjacent to said first neighbor region and said second transfer region being located adjacent to said second neighbor region.

12. The method of claim 11 further comprising the step of:
    moving said first and second input state further along said third line of normal cells using a fourth clock controlling both a third and a fourth transfer region of said third line of normal cells, said third transfer region being located adjacent to said first transfer region and said fourth transfer region being located adjacent to said second transfer region.

13. The method of claim 10 further comprising the step of:
    expressing said first input state at a first output region of said third line of normal cells, said expressing comprising using a fifth clock to latch said first output region coincident with said first input state being available to be expressed at said first output region.

14. The method of claim 10 further comprising the step of:
    expressing said second input state at a first output region of said third line of normal cells, said expressing comprising using a fifth clock to latch said first output region coincident with said first input state being available to be expressed at said first output region.

15. The method of claim 13 further comprising the step of:
    expressing said second input state at a second output region of a fourth line of normal cells, said fourth line of normal cells being arranged substantially orthogonal to said first and second lines of normal cells and connected to said first line of normal cells at a third common cell and to said second line of normal cells at a fourth common cell, and wherein said expressing said second input state further comprises using a sixth clock to latch said second output region coincident with said second input state being available to be expressed at said second output region.

16. The method of claim 15 further comprising the step of:
    logically combining said first and second input state using a combinational logic gate connected to said first and second output regions and wherein said combinational logic gate is controlled by a sixth clock.

17. The method of claim 16 wherein said logically combining comprises ANDing said first and second input states.

18. The method of claim 16 wherein said logically combining comprises ORing said first and second input states.

* * * * *